July 17, 1951 W. E. BEAMAN 2,561,167
EXPANSION UNIT TO COMPENSATE FOR TEMPERATURE
CHANGES IN A VEHICLE HYDRAULIC DRIVE SYSTEM
Filed Jan. 28, 1946 3 Sheets-Sheet 1
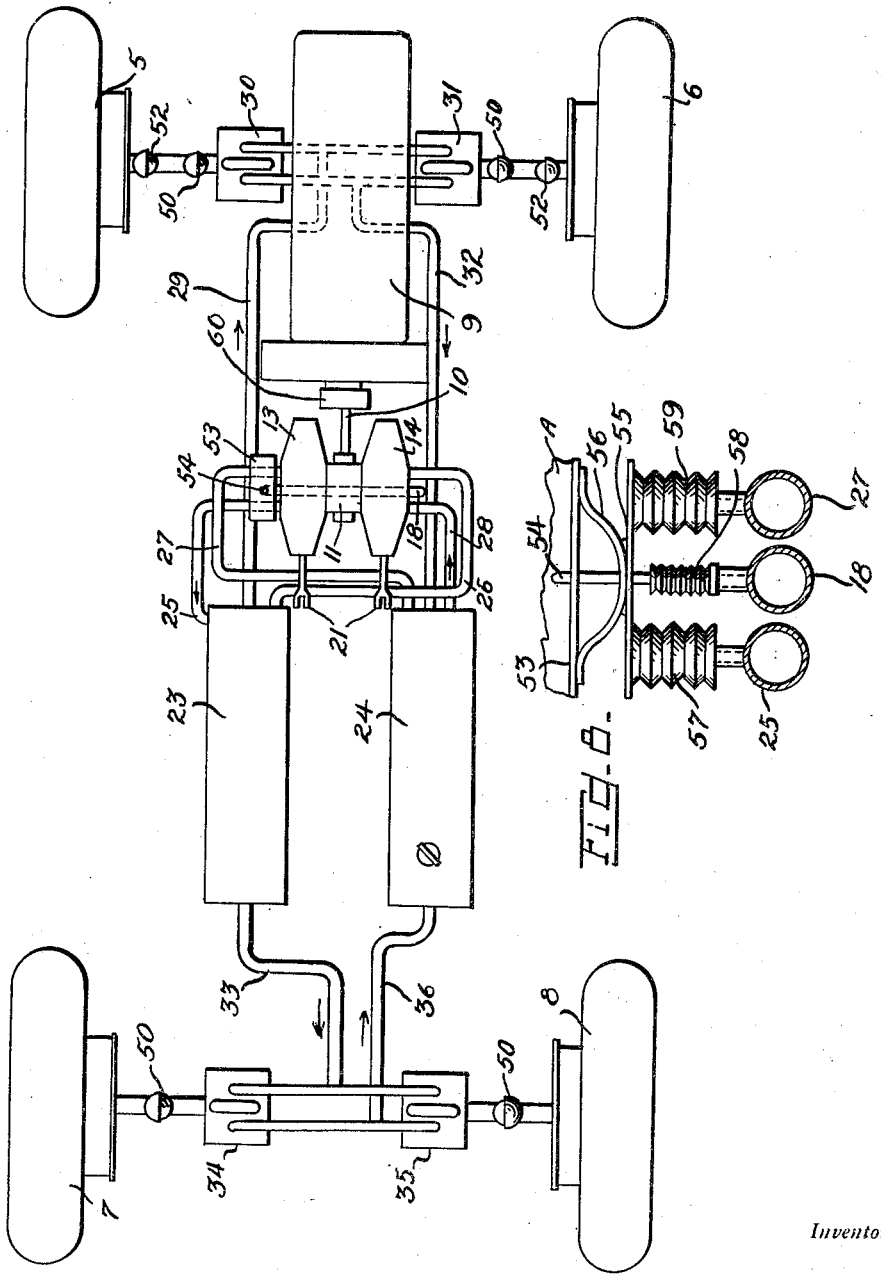
Inventor
William E. Beaman
By Clarence A. O'Brien
and Harvey B. Jackson
Attorneys

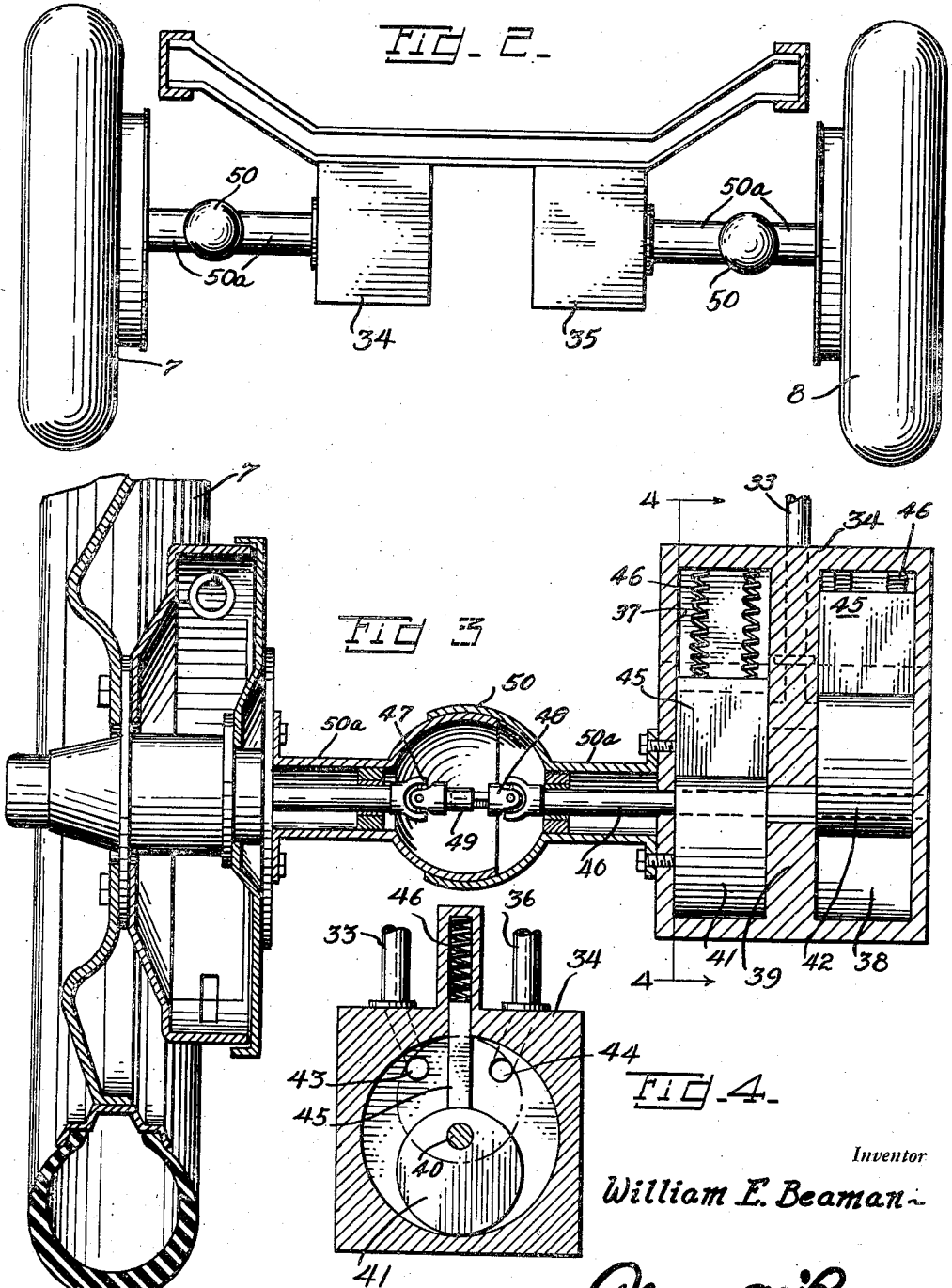

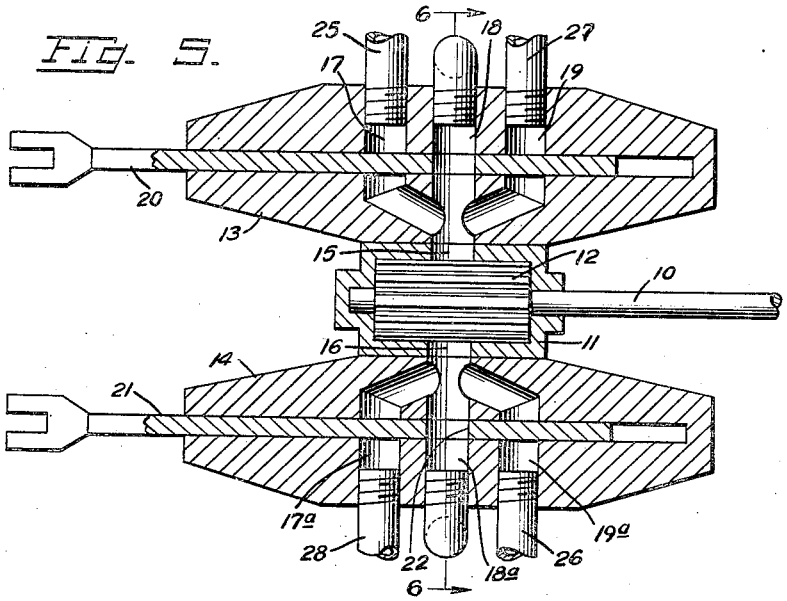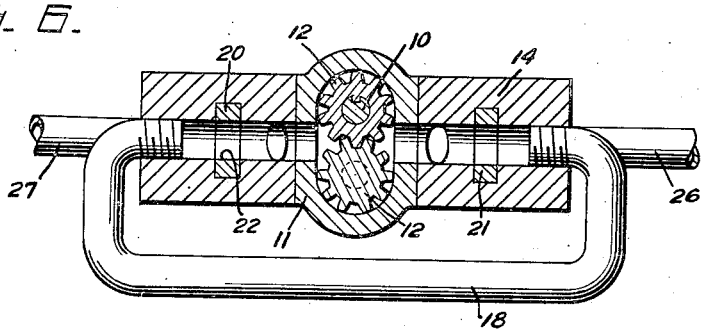

Patented July 17, 1951

2,561,167

UNITED STATES PATENT OFFICE 2,561,167

EXPANSION UNIT TO COMPENSATE FOR TEMPERATURE CHANGES IN A VEHICLE HYDRAULIC DRIVE SYSTEM

William E. Beaman, Foresthill, Calif.

Application January 28, 1946, Serial No. 643,932

6 Claims. (Cl. 180—66)

The present invention relates to new and useful improvements in drive means for motor-driven vehicles or for any shaft used for driving machinery, a ship's propeller or the like and more particularly to a combination hydraulic transmission, differential and braking system between a prime mover and a driven element.

An important object of the present invention is to provide a mechanism of this character by means of which each of the four wheels of the vehicle are independently driven through the provision of a central hydraulic system.

A further object of the invention is to provide hydraulic drive means for the wheels of the vehicle and embodying means for reversing the drive thereof.

A still further object is to provide an apparatus of this character of simple and practical construction, which is efficient and reliable in operation, relatively inexpensive to manufacture and install in operative position on the vehicle and which otherwise is well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view.

Figure 2 is an end elevational view of a pair of the drive wheels and with parts of the vehicle frame broken away and shown in section.

Figure 3 is an enlarged sectional view of the drive unit for one of the wheels.

Figure 4 is a sectional view taken on a line 4—4 of Figure 3.

Figure 5 is an enlarged sectional view of the gear pump and the slide valve control means for the forward, reverse and neutral passages leading from the intake and discharge sides of the pump.

Figure 6 is a sectional view taken substantially on a line 6—6 of Figure 5.

Figure 7 is a sectional view of the flexible drive shaft for one of the front wheels, and Figure 8 is a detail of the expansion unit for the hydraulic system.

Referring now to the drawings in detail wherein for the purpose of illustration I have disclosed a preferred embodiment of the invention the numerals 5 and 6 designate the front wheels of a vehicle while the numerals 7 and 8 represent the rear wheels thereof. A power plant is shown at 9 which is of conventional construction, such as an internal combustion engine, having its crank shaft 10 extending from the rear end thereof into a gear pump housing 11 also of conventional construction, the housing 11 having the pump gears 12 operatively mounted therein.

To each side of the housing 11 are secured the valve housings 13 and 14 communicating respectively with the intake and discharge sides of the pump by means of ports 15 and 16.

Spaced parallel passages 17, 18 and 19 are formed in the housing 13 and similar passages 17a, 18a and 19a are formed in the housing 14 and communicate with the respective passages 15 and 16, the parallel passages in each valve housing being controlled respectively by slide valves 20 and 21 each having a port 22 arranged to open one of said parallel passages while the remaining passages are closed.

The passages 17 and 17a of the valve housings may be designated as forward fluid drive passages, the passages 18 and 18a being bypass passages extending between the two valve housings while the passages 19 and 19a represent the reverse drive fluid passages.

A pair of tanks 23 and 24 are included in the system, the passage 17 being connected to the tank 23 by means of a pipe 25 and the passage 19a being also connected to the tank 23 by means of a pipe 26. The passage 19 is connected to the tank 24 by means of a pipe 27 and the passage 17a is also connected to the tank 24 by means of a pipe 28.

A pipe 29 leads from the front end of the tank 23 to the front wheel drive units 30 and 31 for the front wheels 5 and 6 respectively and a pipe 32 likewise leads from the front end of the tank 24 to said front drive units 30 and 31.

A pipe 33 extends from the rear end of the tank 23 to the drive units 34 and 35 for the rear wheels 7 and 8 respectively and a pipe 36 likewise leads from the rear end of the tank 24 to the rear drive units.

Each of the drive units 30, 31, 34 and 35 are of duplicate construction and accordingly a detailed explanation of one will suffice for all.

Each of said drive units is constructed in the form of a pump including annular motor chambers 37 and 38 separated by a partition 39. A drive shaft 40 is journaled in the partition 39 and projects outwardly through one side of the drive unit, the shaft having annular pistons 41 and 42 secured thereto for working in the respective chambers 37 and 38, the pistons being eccentrically mounted on the shaft and are offset from each other at diametrically opposite sides of the shaft.

The partition 39 is provided with intake and discharge ports 43 and 44 communicating with both of the chambers and to which the pipes leading from one end of the tanks 23 and 24 are connected, such as the pipes 33 and 36 as shown in Figure 4. The intake and exhaust ports 43 and 44 are separated by means of a sliding abutment 45 working in each of the chambers and held against the periphery of the piston by coil springs 46.

The drive shaft 40 constitutes the axle for one of the wheels such as shown at 7, the axle being constructed of inner and outer sections connected by universal joints 47 and 48 to an intermediate extensible axle section 49, the universal joints and the axle section 49 being enclosed within a ball and socket housing 50 and housing extensions 50a to provide for the independent movement of the wheel when encountering a road irregularity.

The front wheel construction as shown in Figure 7 of the drawing is also provided with a universal joint 51 adjacent the outer end of the drive shaft 40 that is enclosed within an outer ball and socket housing 52 to provide for the steering of the front wheels.

In the operation of the device the gear pump 12 is constantly driven by the engine 9 and when it is desired to place the drive system in its neutral position the slide valves 20 and 21 are moved to register the ports 22 thereof with the bypass passages 18 and 18a, the remaining passages in the valve housings 13 and 14 thus being cut off.

When it is desired to drive the vehicle forwardly the slide valves 20 and 21 are moved into a position to open the passages 17 and 17a whereby fluid will be pumped through the pipe 25 into the tank 23 and then moved forwardly and rearwardly through the pipes 29 and 33 to the front and rear drive units 30, 31, 34, and 35, the fluid being returned to the tank 24 by way of the pipes 32 and 36 as shown by the arrows in Figure 1 of the drawing.

When it is desired to reverse the drive the slide valves 20 and 21 are moved into a position to open the ports 19 and 19a whereby the direction of the flow through the tanks 23 and 24 as well as through the pipes leading from the front and rear end thereof will be reversed, and the drive units 30, 31, 34 and 35 at the front and rear ends of the vehicle will be driven in a reverse direction.

In Figure 8 of the drawing I have illustrated an expansion unit for the system to compensate for temperature changes and which comprises a plate 53 secured to a part of the frame A of the vehicle through which a square rod 54 is mounted for vertical sliding movement. Secured to the rod 54 is a lower plate 55 urged downwardly away from the upper plate 53 by a leaf spring 56.

Bellows members 57, 58 and 59 are connected at their lower ends respectively to the pipes 25, 18 and 27, the bellows 57 and 59 being of equal size and all of the bellows have their upper ends bearing against the plate 55 and these bellows are large enough to take care of the normal expansion and contraction of the fluid in the system for either the forward and reverse drives. The bellows 58 for the by-pass passage is of a size proportional to either the bellows 57 and 59, this proportion being equal to the proportion of fluid in the forward mechanism as compared to the fluid in the by-pass. Thus the change in bellows 58 would be equal in length to the change in length of either the bellows 57 or 59.

It will be apparent from the foregoing that by regulating the slide valves 20 and 21 the vehicle may be driven in either a forward or rearward direction and the individual drive units for the several wheels will provide a differential in the drive thereof. Likewise it will be apparent that a braking effect will be obtained, when it is desired, by the manipulation of the valves 20 and 21 into their forward and reverse positions.

It is evident that the transmission is in operation at all times, either as a driving force or as a brake; hence the speed of the engine, at any given speed of the vehicle, must always remain the same. This will remain true whether the horsepower created is used or not. The horsepower needed for a hill will be proportionately greater than the horsepower required for driving on a level road. Preferably a conventional form of overdrive mechanism 60 is installed between the engine 9 and pump 11.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood however, that even though there is herein shown and described a preferred embodiment of the invention the same is susceptible to certain changes fully comprehended by the spirit of the invention as herein described and the scope of the appended claims.

Having thus described the invention, what is claimed as new is:

1. In a hydraulic drive for vehicles having a fluid drive unit for each wheel and a closed fluid system including a motor operated pump connected to supply liquid pressure to the drive units, control means at the inlet and outlet sides of the pump to reverse the flow of fluid to said drive units, and an expansion unit for the system to compensate for temperature changes of a liquid therein, said expansion unit including a plate fixed to the vehicle, a rod slidably carried by the plate, a further plate fixed to the rod, spring means spacing said plates, and bellows members carried by the further plate and communicating with one side of the pump.

2. In a hydraulic drive for vehicles having a fluid drive unit for each wheel and a closed fluid system including a motor operated pump connected to supply liquid pressure to the drive units, a pair of valve housings connected to the inlet and outlet sides of the pump and each having forward, reverse and by-pass passages therein, means connecting said forward and reverse passages to the drive units, a by-pass conduit connecting the by-pass passages of said valve housings, valves in said valve housings controlling the flow of fluid through said passages, and an expansion unit for the system to compensate for temperature changes, said expansion unit communicating with one side of the pump and including a plate fixed to the vehicle, a rod slidably carried by the plate, a further plate fixed to the rod, spring means spacing said plates, and bellows members carried by the further plate and communicating with the by-pass conduit and said means connecting said forward and reverse passages to the drive units.

3. In a hydraulic drive for vehicles having a fluid drive unit for each wheel and a closed fluid system including a motor operated pump connected to supply liquid pressure to the drive units, a pair of valve housings connected to the inlet and outlet sides of the pump and having forward, reverse and by-pass passages therein, a pair of tanks, pipes connecting the forward and reverse passages of each valve housing to each tank, valves controlling the flow of liquid through said passages to reverse the flow of fluid to respective tanks, a by-pass conduit connecting the by-pass passages, fluid connections from the tank to the drive units, and an expansion unit for the system to compensate for temperature changes, said expansion unit including a plate fixed to the vehicle, a rod slidably carried by the plate, a further plate fixed to the rod, spring means spacing said plates, a first bellows member connected to and communicating with the by-pass conduit, and further bellows members carried by the further plate and communicating with said pipes leading from one side of the pump.

4. In a hydraulic drive for vehicles having a fluid drive unit for each wheel and a closed fluid system including a motor operated pump connected to supply liquid pressure to the drive units, a pair of tanks connected direct to the respective drive units, forward and reverse passages connecting both the inlet and outlet sides of the pump to the respective tanks, valve means controlling the flow of liquid through said passages, and a fluid expansion unit for the system to compensate for temperature changes, said fluid expansion unit comprising an upper plate secured to a part of the vehicle, a rod slidably carried by said upper plate, a lower plate fixed to said rod, resilient means interposed between said plates and urging the lower plate from the upper plate, a group of bellows members depending from said lower plate and having lower ends connected to and in communication with said passages at one side of the pump.

5. In a hydraulic drive for vehicles having a fluid drive unit for each axle wheel and a closed fluid system including a motor operated pump connected to supply liquid pressure to the drive units; the improvement of which comprises an expansion unit for the system to compensate for temperature changes therein, said expansion unit including a plate fixed to the vehicle, a rod slidably carried by the plate, a further plate fixed to the rod, resilient means interposed between said plates for spacing the further plate from the first named plate, and bellows members supported by the further plate and operatively connected to the system.

6. In a hydraulic drive for vehicles having a fluid drive unit for each wheel and a motor operated pump connected to supply liquid pressure to each drive unit, a valve unit having forward, reverse and by-pass passages therein communicating with one side of the pump, a pipe leading from the forward passage and connected to the drive units, a second pipe leading from the reverse passage and connected to the drive units, a by-pass pipe leading from the by-pass passage to the other side of the pump, a valve in the valve unit for selectively opening one of the passages, and an expansion unit for the pipes to compensate for temperature changes of a liquid in the pipes, said expansion unit including a plate fixed to the vehicle, a rod slidably carried by the plate, a further plate fixed to the rod, spring means spacing the plates from each other, and a plurality of bellows members carried by said further plate and communicating with said pipes.

WILLIAM E. BEAMAN.

REFERENCES CITED

The following references are of record in the file of this patent:

UNITED STATES PATENTS

| Number | Name | Date |
| --- | --- | --- |
| 154,298 | Teal | Aug. 18, 1874 |
| 183,081 | Thayer | Oct. 10, 1876 |
| 806,759 | Tuttle | Dec. 5, 1905 |
| 873,819 | Wing | Dec. 17, 1907 |
| 958,212 | Baab | May 17, 1910 |
| 972,223 | Pearson | Oct. 11, 1910 |
| 1,099,161 | Brown | June 9, 1914 |
| 1,380,401 | McQueen | June 7, 1921 |
| 1,999,288 | Fjellstedt | Apr. 30, 1935 |
| 2,023,524 | Heaton | Dec. 10, 1935 |
| 2,228,411 | Sheridan | Jan. 14, 1941 |

FOREIGN PATENTS

| Number | Country | Date |
| --- | --- | --- |
| 618,899 | France | Dec. 23, 1926 |
| 636,922 | Germany | Oct. 17, 1936 |
| 776,645 | France | Nov. 8, 1934 |